United States Patent [19]

Takahashi

[11] Patent Number: 4,792,078

[45] Date of Patent: Dec. 20, 1988

[54] DEVICE FOR CONTROLLING CONCENTRATION AND TEMPERATURE OF FLUX

[76] Inventor: Kiyohachi Takahashi, 1-14-21, Musashidai, Fuchu-shi, Tokyo, Japan

[21] Appl. No.: 60,461

[22] Filed: Jun. 11, 1987

[51] Int. Cl.⁴ .............................................. B23K 3/00
[52] U.S. Cl. ..................................... 228/8; 228/56.2; 228/56.5; 118/602; 118/688
[58] Field of Search ............... 228/223, 207, 103, 104, 228/8, 33, 40, 56.2, 56.5; 118/667, 688, 689, 712, 602

[56] References Cited

U.S. PATENT DOCUMENTS

| | | | |
|---|---|---|---|
| 2,516,884 | 8/1950 | Kyame | 118/602 |
| 2,590,538 | 3/1952 | Huck | 118/602 |
| 2,791,516 | 5/1957 | Chambers et al. | 118/602 |
| 3,058,441 | 10/1962 | Walker et al. | 228/33 |
| 3,451,374 | 6/1969 | Clausen et al. | 118/602 |
| 4,550,036 | 10/1985 | Ludwig et al. | 118/602 |

OTHER PUBLICATIONS

Wave Solder Flux Automatic Feed System, *Research Disclosure*, No. 244, Aug. 1984.

*Primary Examiner*—Nicholas P. Godici
*Assistant Examiner*—Samuel M. Heinrich
*Attorney, Agent, or Firm*—Parkhurst, Oliff & Berridge

[57] ABSTRACT

A device for controlling the concentration and the temperature of a flux comprising a circulation system which includes a pump connected to a flux tank by supplying and returning paths and which circulates the flux by driving the pump, reservoirs for a flux stock solution and a diluent, respectively, which are each connected to the circulation system, a heating means and/or a cooling means provided in the supplying path of the circulation system, a filter which is connected to the returning path of the circulation system, a concentration controlling mechanism which is operated in association with a specific gravity sensor attached to the flux tank, and a temperature controlling mechanism which is operated in association with a temperature sensor which is provided in the heating means and/or the cooling means. This device enables the concentration of the flux in the flux tank to be made uniform, the temperature thereof to be made constant and the flux to be purified.

6 Claims, 1 Drawing Sheet

DEVICE FOR CONTROLLING CONCENTRATION AND TEMPERATURE OF FLUX

BACKGROUND OF THE INVENTION

1. Field of the Invention

The present invention relates to a device applied to an automatic soldering apparatus for soldering a printed circuit board which is mounted on electronic appliances, communication apparatus, measuring instruments, etc. in order to keep the quality of a flux constant and, more particularly, to a device for controlling the concentration and the temperature of a flux by adjusting the concentration, the temperature, the purity, etc. of the flux.

2. Description of the Prior Art

As one of the conditions for keeping the high quality of a soldered printed circuit board, it is generally required that good flux application has been stably achieved before soldering. Therefore, in an automatic soldering apparatus, various measures have conventionally been taken in order to keep the quality, in particular, the concentration, the purity, etc. of the flux in a flux tank constant. Such methods of controlling the concentration of a flux as those disclosed in, for example, Japanese Patent Laid-Open No. 24556/1976, Japanese Patent Laid-Open No. 11159/1974 and Japanese Patent Laid-Open No. 101464/1977 have been proposed and developed. In these methods, the specific gravity of the flux in a flux tank is first measured by an electromagnetic or optical detecting means, the measured value is corrected by the value of the temperature of the flux which has been measured by a temperature sensor or the like simultaneously with the measurement of the specific gravity value, thereby obtaining the accurate concentration of the flux, and the amounts of flux stock solution and diluent to be supplied to the flux tank are adjusted so that the concentration value obtained is constantly kept within an appropriate range.

However, such a conventional device for controlling the concentration of a flux requires various complicated structural members such as a correction arithmetic circuit for calculating the accurate concentration of a flux on the basis of the measured values of the specific gravity and the temperature of the flux, and a control circuit and a control mechanism for constantly maintaining the concentration of the flux in the flux tank in the most activated range on the basis of the calculated value of the concentration of the flux and in correspondence with the temperature change of the flux. Therefore, the cost of the entire concentration controlling device inconveniently becomes high.

The feature of the above-described conventional devices lies in that the concentration of the flux in a flux tank is controlled so as to be constant on the basis of the specific gravity value of the flux which has been corrected in consideration of the temperature value. This controlling method is based on the technical view that the characteristics of the flux mainly depend upon the value of the specific gravity value of the flux. Actually, however, since the characteristics of a flux are greatly influenced by the temperature value as well as the specific gravity value, as has already been confirmed by the present inventors, a conventional device cannot constantly keep the characteristics of a flux good, specifically, when the temperature of the flux is considerably high or low. Thus, the conventional methods of controlling the concentration of a flux are not always satisfactory.

Generally, fluxes come to have an appropriate viscosity and are activated when they have a temperature of not lower than 18° C. On the other hand, if the temperature of the fluxes exceed 25° C., the amount of evaporation of the diluent in the flux economically disadvantageously becomes very large. Therefore, the temperature of a flux which is suitable for good application to a printed circuit board is in the range of 18° to 25° C., in particular, 20° C. However, no special measure has conventionally been taken in order to constantly and exactly maintain the flux at an appropriate temperature, or no device for keeping the characteristics of a flux good on the basis of the temperature control of the flux has ever existed.

Furthermore, in a conventional soldering apparatus, the concentration of the flux in a flux tank is apt to be non-uniform, which may bring about a problem of the generation of slight unevenness in application.

In addition, it is generally considered to be one of the conditions for obtaining high-quality soldered products that a flux without any impurities mixed thereinto should be stably supplied to a flux tank. Therefore, an automatic soldering apparatus has hitherto been required to be equipped with a mechanism which satisfies this condition.

SUMMARY OF THE INVENTION

Accordingly, it is an object of the present invention to provide a device for controlling the concentration and the temperature of a flux which is capable of maintaining the flux in a flux tank at a constant concentration, at a constant temperature, and at a high purity, and which has a simplified structure.

As a result of studies by the present inventors, it has been found that control of the concentration of a flux by means of a chemical sensor in a flux tank and a control circuit which is operated in association with the chemical sensor, and control of the temperature of the flux by means of a heating means and a cooling means equipped with a temperature sensor which are incorporated into a flux circulation system and a control circuit which is operated in association with the temperature sensor stably enable the concentration of the flux to be made uniform and the temperature of the flux to be made constant. On the basis of this finding, the present invention has been achieved.

To achieve this aim, a device for controlling the concentration and the temperature of a flux according to the present invention is a device provided separately from a flux tank of an automatic soldering apparatus and comprises:

- a circulation system which includes a pump connected to the flux tank by supplying and returning paths and which circulates the flux by driving the pump;
- reservoirs for a flux stock solution and a diluent, respectively, which are each connected to the circulation system through valves;
- a concentration controlling mechanism which adjusts the supply of the flux stock solution or the diluent by opening or closing of the valves in association with a specific gravity sensor attached to the flux tank;
- a heating means and/or a cooling means provided in the supplying path of the circulation system;

a temperature controlling mechanism which adjusts the operations of the heating means and/or the cooling means in association with a temperature sensor which is incorporated thereinto; and a filter which is connected to the returning path of the circulation system.

The above and other objects, features and advantages of the present invention will become clear from the following description of the preferred embodiment thereof, taken in conjunction with the accompanying drawings.

DETAILED DESCRIPTION OF THE INVENTION

A controlling device according to the present invention is a unit which is provided separately from a flux tank of an automatic soldering apparatus in such a manner as to be attachable to the flux tank, and has a flux circulation system which consists of a flux tank, a pump and supplying and returning paths connected between the flux tank and the pump.

The device according to the present invention is capable of executing the concentration control and the temperature control of a flux independently of each other. This device is provided with a concentration controlling mechanism for adjusting the supply of a flux stock solution or a diluent by opening and closing of the valves in the circulation system, thereby controlling the concentration of the flux in the flux tank. In this case, the measured value of the specific gravity is not corrected unlike in the prior art.

The temperature control of the flux is executed by means of the following heating means and cooling means and temperature controlling mechanism.

The heating means and the cooling means used in the present invention may be any means that is capable of adjusting the flux in the flux tank to a desired temperature (18° to 25° C.) by heating or cooling it. The heating means, has a structure in which, for example, a heating coil is disposed around a flux passage or a structure in which hot air is blown to a flux flow pipe, and as the cooling means, for example, a water jacket provided in the vicinity of the flux passage or a cooled metal pipe through which the flux is passed is used. For the purpose of temperature control, the heating means is usually adopted, but when the temperature exceeds 25° C. as in summer, it is necessary to utilize the cooling means.

Figure 2:
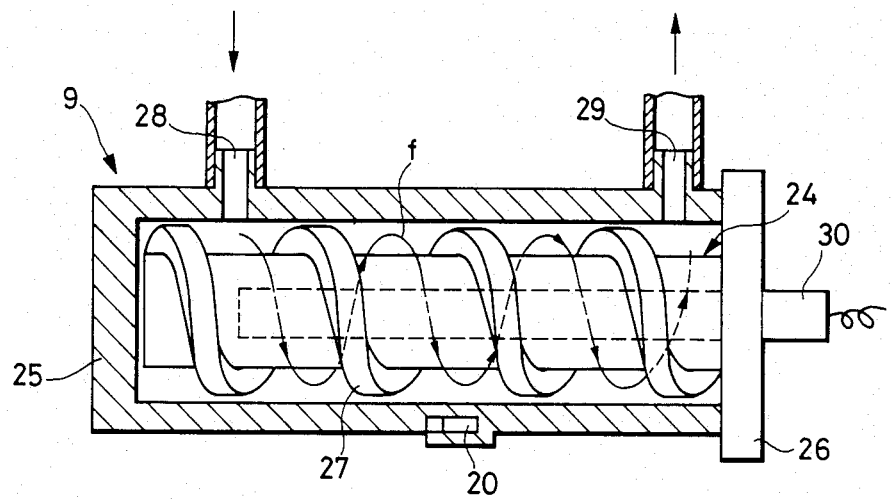
FIG. 2 shows the structure of the heating means in the embodiment shown in FIG. 1.

Above all, a heating means having a structure shown in FIG. 2 is preferable. This heating means has a shaft 24 having a built-in heater 30 and a spiral collar provided 27 on the surface thereof is accommodated in a cylindrical container 25 so as to form a spiral passage f, and a flux is passed through the spiral passage while being heated by the heater 30. In this heating means, a temperature sensor 20 is provided on the surface of or in the interior of the inner wall of the container 25.

As the filter in the present invention, a filtering medium which is capable of removing the impurities or extraneous matters from the used flux, thereby reproducing it as a flux without any or with little inclusions is used. For example, filter paper, filter cloth and a fibrous filtering medium are preferable.

Figure 1:
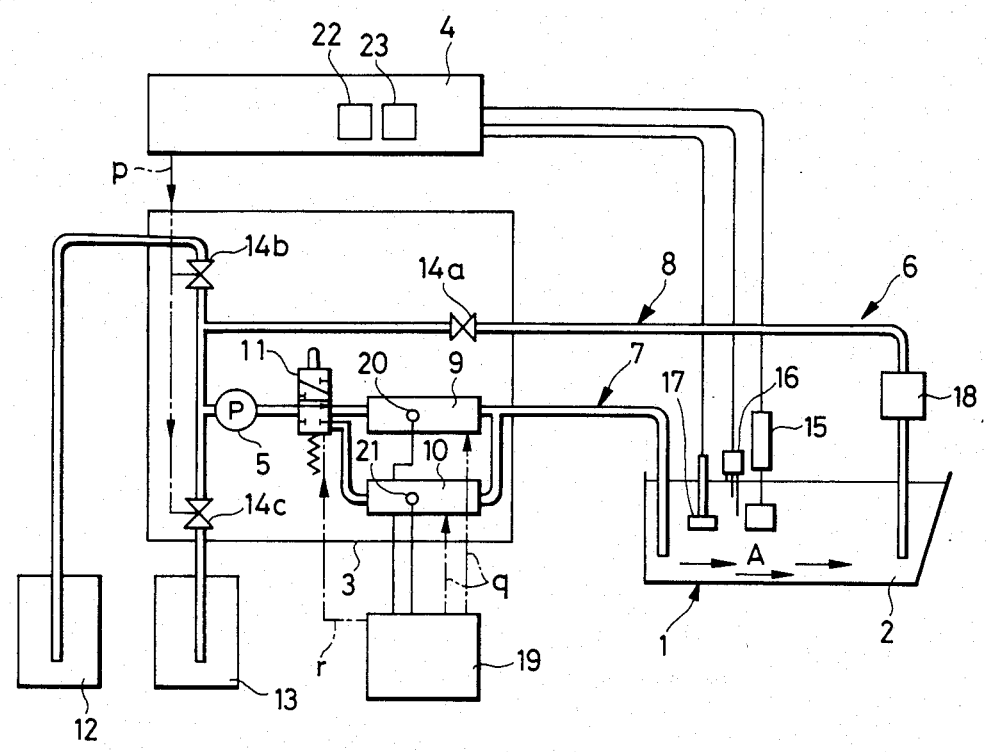
FIG. 1 is a schematic view of an embodiment of the structure of a device for controlling the concentration and the temperature of a flux according to the present invention.

In the controlling device according to the present invention, a flux 2 is circulated by the operation of a pump 5 of the circulation system, as shown in FIG. 1. In other words, the flux 2 is supplied from reservoirs 12, 13 to a flux tank 1, flows in the flux tank 1, is collected from the flux tank 1, and is again returned to the flux tank 1. As a result, a substantially constant flow of the flux 2 indicated by the arrow A is formed within the flux tank 1, thereby making the distribution of the flux concentration uniform. In addition, the operations of a heating means 9 and a cooling means 10 make the temperature of the circulation flow of the flux 2 constant. Furthermore, in the device of the present invention, extraneous matters and impurities are removed from the circulating flux 2 by the operation of a filter 18.

As described above, the device according to the present invention having a structure in which the flow of the flux is stably formed in the flux tank and the temperature of the flux is elevated or lowered by the specific means 9 and 10, enables the concentration of the flux in the flux tank to be uniform and the temperature thereof constant. Furthermore, since impurities and the like are removed by the filter, the high-purity flux is constantly maintained.

In addition, the device according to the present invention, which dispenses with a complicated control mechanism for keeping the concentration of the flux constant, has a simple structure and, hence, the manufacturing cost is very low.

DESCRIPTION OF THE PREFERRED EMBODIMENT

An embodiment of the present invention will be explained hereinunder with reference to the accompanying drawings.

In FIG. 1, the reference numeral 1 denotes a flux tank of an automatic soldering apparatus, and 3 and 4 denotes a pump unit and a control unit, respectively, for maintaining the quality of a flux 2 in the flux tank 1. A circulation system 6 is provided which connects a pump 5 in the pump unit 3 and the flux tank 1 by supplying and returning paths, whereby the flux 2 is circulated by the operation of the pump 5, in other words, the flux 2 is supplied to the flux tank 1 by the pump 5, flows within the tank 1 as indicated by the arrow A, and is collected from the tank 1 to the pump 5. As the pump 5, a conventional liquid supply pump may be used.

A heating means 9 consisting of a heating coil and a cooling means 10 consisting of a cooled metal pipe are disposed in parallel in the supplying path 7 of the circulation system 6. A two-way valve 11 is provided between the pump 5 and the heating means 9 and the cooling means in the supplying path 7. On the other hand, in the returning path 8 of the circulation system, a filter 18 is connected to a valve 14a. To the circulation system 6, a flux stock solution reservoir 12 and a diluent reservoir 13 are connected through valves 14b and 14c, respectively.

A specific gravity sensor 15, a liquid height sensor 16 and a temperature sensor 17 are provided above the flux tank 1, each of the sensors 15, 16 and 17 being electrically connected to the control unit 4. The specific gravity sensor 15 is a sensor which detects the specific gravity of the flux from the position at which the float stops. The liquid height sensor 16 is a sensor for detecting whether the liquid height of the flux is in the allowable range, under the level of the lowest liquid height, or above the maximum liquid height by the contact of three probes with the liquid surface of the flux.

The temperature sensor 17 is a sensor for detecting the temperature of the flux by the faculty of a thermocouple or the like. Further, a life sensor for detecting the contamination of the flux from the light transmittance may be provided. The values detected by these sensors are displayed on a concentration panel 22 and a temperature panel 23, respectively, of the control unit 4. The concentration value of the flux is obtained by the calculation of the detected specific gravity value by means of an arithmetic circuit (not shown). In the device of the present invention, it is not that the mechanism of the pump unit 3 is operated on the basis of the indicated temperature value in order to control the temperature of the flux in the flux tank 1, but that the actual temperature value of the flux is indicated merely for confirmation. The control unit 4 supplies a control signal q to the valves 14b and 14c on the basis of the indicated concentration value of the flux, so as to open or close the valves 14b and 14c, thereby additionally supplying the flux stock solution or the diluent to the circulation system 6.

The heating means 9 and the cooling means 10 in this device are provided with the respective temperature sensors 20 and 21 for measuring the temperature of the flux flowing there, and a control circuit 19 which is so programmed as to supply a control signal q to the heating means 9 or the cooling means 10 in order to adjust the operations of these means, or supply a switching signal r to the valve 11, if desired, in order to change over between the heating means 9 and the cooling means 10 for passing the flux 2 therethrough, on the basis of the detected temperature value in association with the temperature sensors 20 and 21.

FIG. 2 shows the structure of a preferred heating means 9. This means 9 is composed of a shaft 24 with a spiral collar 27 provided therearound and with a lid 24, a cylindrical container 25 for accommodating the shaft 24 so as to form a spiral flow passage f, a heater 30 inserted into the central portion of the shaft 24, and a temperature sensor 20 provided in the interior of the inner wall of the container 25 at the central portion thereof. During the use of the heating means 9, the flux 2 is supplied from the entrance 28 at the lower portion of the container 25 into the container 25, flows spirally within the container 25, and is thereafter collected from the exit 29 at the upper portion of the container 25 while being heated by the heater 30. The operation of the heater 30 is controlled by the operation of the control circuit 19 in association with the temperature sensor 20. The temperature of not the flux in the flux tank 1 but the flux 2 flowing in the heating/cooling means is measured, and on the basis of the measured temperature value the temperature of the flux 2 is controlled. Consequently, even if the flow passage between the heating-/cooling means and the flux tank 1 is long, it is possible to control the temperature with good response, and to constantly hold the flux 2 in the flux tank 1 exactly at a predetermined temperature.

When this device is used, the valve 14a is first opened, the two-way valve 11 is connected to a predetermined means, and the pump 5 is next driven to circulate the flux 2. Simultaneously, the heating means 9 is operated in ordinary seasons, the cooling means 10 being operated in summer season of hot temperatures.

During operation, by virtue of the faculty of the control unit 4, if the indicated concentration value of the flux is lower than a predetermined reference, the valve 14b of the reservoir 12 is opened so as to supply the flux stock solution to the circulation system 6, while if the indicated value is higher than the predetermined reference, the valve 14c of the reservoir 13 is opened so as to supply the diluent to the circulation system. Further, the operation of the control circuit 19 appropriately adjusts the operations of the means 9 and 10 in accordance with the indicated temperature of the flux 2.

According to experiments, in the device of the embodiment, since the flux 2 in the tank 1 is constantly mixed by the constant turbulent flow A formed in the flux tank 1, the distribution of the flux concentration was uniform. The temperature of the flux was also kept constant and, in addition, the operation of the filter 18 maintained the high purity of the flux 2.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A device for controlling the temperature of a flux provided separately from a flux tank of an automatic soldering apparatus, said device comprising:
   a circulation system which consists of a flux tank, a pump and supplying and returning paths connected between the tank and the pump and which circulates said flux by driving said pump;
   reservoirs for a flux stock solution and a diluent, respectively, which are each connected to said circulation system;
   a heating means and/or a cooling means provided in said supplying path of said circulation system;
   a temperature controlling mechanism which adjusts the operation of said heating means and/or said cooling means in association with a temperature sensor which is incorporated into said heating means and/or said cooling means; and
   a filter which is connected to said returning path of said circulation system.

2. A device for controlling the concentration and the temperature of a flux provided separately from a flux tank of an automatic soldering apparatus, said device comprising:
   a circulation system which consists of a flux tank, a pump and supplying and returning paths connected between the tank and the pump and which circulates said flux by driving said pump;
   reservoirs for a flux stock solution and a diluent, respectively, which are each connected to said circulation system through valves;
   a concentration controlling mechanism which adjusts the supply of said flux stock solution or said diluent by opening or closing of said valves in associated with a specific gravity sensor attached to said flux tank;
   a heating means and/or a cooling means provided in said supplying path of said circulation system;
   a temperature controlling mechanism which adjusts the operation of said heating means and/or said cooling means in association with a temperature sensor which is incorporated into said heating means and/or said cooling means;

a filter which is connected to said returning path of said circulation system.

3. A device according to claim 1, wherein said heating means has a structure in which a heating coil is disposed around a flux flow passage or a structure in which hot air is blown to a flux flow pipe.

4. A device according to claim 1, wherein said heating means is composed of a cylindrical container which accommodates a shaft with a built-in heater and with a spiral collar provided on the surface thereof, so as to form a spiral flux flow passage.

5. A device according to claim 1, wherein said cooling means has a structure in which a water jacket is formed in the vicinity of a flux flow passage, or a structure in which said flux is passed through a cooled metal pipe.

6. A device according to claim 1, wherein said filter is filter papter, filter cloth or a fibrous filtering means.

* * * * *